United States Patent [19]

Seidl

[11] 4,282,443
[45] Aug. 4, 1981

[54] ENERGY CONVERSION APPARATUS

[76] Inventor: George H. Seidl, 203 Morris Ave., Trenton, N.J. 08611

[21] Appl. No.: 88,435

[22] Filed: Oct. 26, 1979

[51] Int. Cl.³ .............................................. H02K 7/02
[52] U.S. Cl. ................................... 290/1 R; 310/112
[58] Field of Search ................... 290/1; 310/112, 115; 290/44

[56] References Cited

U.S. PATENT DOCUMENTS

| | | | |
|---|---|---|---|
| 925,385 | 6/1909 | Riecke | 322/4 |
| 1,223,400 | 4/1917 | Kurtz | 310/115 |
| 1,785,965 | 12/1930 | Major | 310/112 |
| 2,561,131 | 7/1951 | Oropeza | 310/112 |
| 3,609,426 | 9/1971 | Gaul | 322/4 |

Primary Examiner—J. V. Truhe
Assistant Examiner—Donald L. Rebsch
Attorney, Agent, or Firm—John J. Kane; Frederick A. Zoda; Albert Sperry

[57] ABSTRACT

An energy conversion apparatus is disclosed adapted to convert any type of rotatable mechanical energy into electrical energy in an efficient manner which includes a plurality of generators positioned upon a rotating wheel of arms wherein the wheel is secured to a rotating drive shaft. Cylinders such as drums are axially oriented around the drive shaft and are caused to rotate in an opposite direction therefrom by a reversing gear system driven by the drive shaft. These cylinders include grooves therein which are adapted to receive a drive belt which extends outward along the individual arms to a pulley located on the rotor shaft of each generator. In this manner the energy of the rotatable driving system which causes the drive shaft to rotate will be efficiently converted into electrical energy by the rotation of the rotors of the generators caused by the rotation of the arms with the drive shaft and the opposite rotation of the belts connected to the rotors of the generators caused by the reversing rotation of the cylinders.

14 Claims, 2 Drawing Figures

ENERGY CONVERSION APPARATUS

BACKGROUND OF THE INVENTION

1. Field of the Invention

The present invention relates to energy conversion systems utilizable to convert one type of non-usable energy into a usable energy such as electricity.

Due to the current energy shortage, it is desirable to make use of conveniently available energy sources which are themselves in their present state unusable but which may be converted into a usable form of energy such as electricity. Examples of such energy would be windmills, water movement, steam engines and the like. Of course, the present invention is utilizable to convert any type of energy which can be formed into a rotating mechanical kinetic form into electrical energy.

2. Description of the Prior Art

Examples of such transmission type conversions are included in U.S. Pat. Nos. 925,385, 3,497,026, 3,609,426 and 3,939,935. These transmission systems are included to show the usage of flywheels to store electrical energy. The present invention makes use of a similar device however, by the particular construction disclosed in the present invention an "electrical flywheel" is effectively created which can be usable to provide electrical power even during some short time periods wherein the power source from the drive means is interrupted. However, the main purpose of the present invention is to convert any type of usable rotating mechanical kinetic energy from the drive means into the final electrical energy for convenience of usage.

SUMMARY OF THE INVENTION

The present invention provides an energy conversion apparatus which is usable to convert any type of mechanically rotatable energy into electrical energy which includes a support member having a first strut and a second strut extending upwardly. A drive shaft is rotatably mounted through the support means and particularly through each strut means. This drive shaft provides the main source of driving power to the entire energy conversion apparatus.

A plurality of arm means are fixedly secured with respect to the drive shaft and extend radially outward therefrom and are therefore rotatable therewith. A generator is located at the outer end of each arm means and is secured to the arm means such as to be also rotatable therewith. Each generator includes a rotatable rotor shaft having a pulley means thereon.

A first cylinder means is rotatably located about the drive shaft means between the arm means and the first strut. Similarly, a second cylinder means is rotatably positioned about the drive shaft means between the arms and the second strut. The first cylinder means is held in place by an inner cylinder guide means which is rotatable with the arm means and the drive shaft and a first outer cylinder guide means which is fixedly secured to the first strut. Each of these two guide means includes a bearing means which supports the first cylinder at the opposite extreme ends thereof to maintain horizontal orientation thereof. Similarly, the second cylinder means is rotatably held in position by the inner cylinder guide means which extends around the innermost edges of the second cylinder means and the second outer cylinder guide means which is fixedly secured to the second strut. Each of these two guide means also include bearing means for maintaining the second cylinder in a rotatable fashion in horizontal orientation.

A first gear assembly is operably secured to the drive shaft means to be driven thereby and is secured to the first cylinder means to rotate it in a direction opposite to the direction of rotation of the drive shaft means. The outer surface of the first cylinder means includes a plurality of grooves thereon which are adapted to receive drive belts therein. These drive belts will extend around the pulley located on the rotor shafts of the generators. In this manner, as the drive shaft, arms and generators are rotated in one direction, the drums will be rotated in the opposite direction to thereby cause a high speed rotation of the rotor of the generator means due to the opposite rotation of the pulley belt associated therewith.

Similarly, a second gear assembly will be provided adjacent the second strut means which is operably secured to the second cylinder means to rotate it in a direction opposite to the direction of rotation of the drive shaft means and the arm means and the generators. in this manner a high speed rotation of the other generators will be achieved. Again, grooves will be located in the outer circumference of the second cylinder to facilitate rotation of the belt means associated therewith.

The first gear assembly preferably includes a first shaft gear means which is fixedly secured to the drive shaft to be rotatable therewith and a first reversing gear means which is rotatably secured to the first strut means and is positioned in engagement with the first shaft gear means. Furthermore, a first gearing means fixedly secured with respect to the first cylinder means and in engagement with the first reversing gear means, will rotatably drive the first cylinder in the opposite direction with respect to the rotation of the drive shaft means. Similarly, the second gear assembly will include a second gear shaft means which is fixedly secured to the drive shaft means to be rotatable therewith as well as a second reversing gear means rotatably secured to the second strut means and positioned in engagement with said second shaft gear means. A second gear ring means will be fixedly secured with respect to the second cylinder means and will be in engagement with the second reversing gear means to rotatably drive the second cylinder means in the direction opposite to the direction of rotation of the drive shaft. In this manner the first and second cylinder means will both be continuously rotating in an opposite direction with respect to the drive shaft.

The present invention may further include a pony motor means which is adapted to be clutchably engaged with the drive shaft to provide initial rotational momentum thereto.

To gather the electricity generated by the generator means a plurality of ducts will be defined within the arms. In other words, the arms will basically be hollow as well as the drive shaft being hollow and electrical lead lines will pass from each generator downwardly through this duct into the hollow conduit within the drive shaft. These lead lines will then extend outwardly to a single gathering location such as the power transfer cap adjacent the end of the conduit to facilitate the gather of this electrical energy produced by the generators.

Each generator may preferably include a flywheel means secured thereto to maintain an approximately constant rotor speed during operation.

It is an object of the present invention to provide an energy conversion apparatus which is particularly usable to convert any type of mechanically rotating kinetic energy into electricity.

It is an object of the present invention to provide an energy conversion apparatus which is efficient in operation.

It is an object of the present invention to provide an energy conversion apparatus which is simple in construction to make it economically feasible for the production of usable energy.

It is an object of the present invention to provide an energy conversion apparatus for creating high speed generator rotor rotation to thereby enhance electrical current production therein.

It is an object of the present invention to provide an energy conversion apparatus which minimizes conventional sources of energy loss such as friction and the like.

It is an object of the present invention to provide an energy conversion apparatus which is particularly capable for converting water movement and wind movement into usable electricity.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
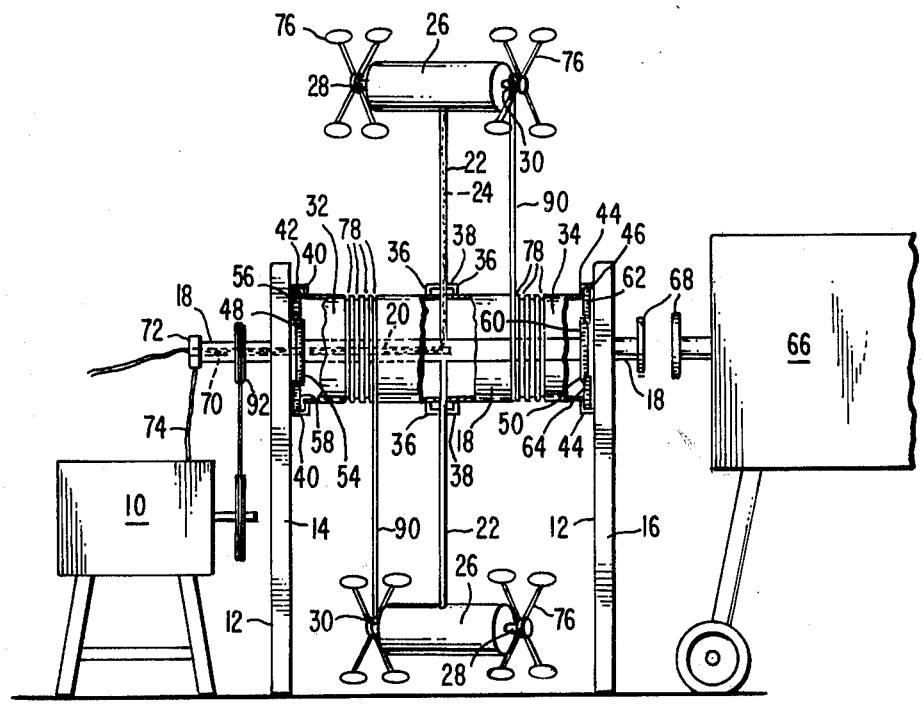
FIG. 1 is a schematic representation of an embodiment of the energy conversion apparatus of the present invention.
Figure 2:
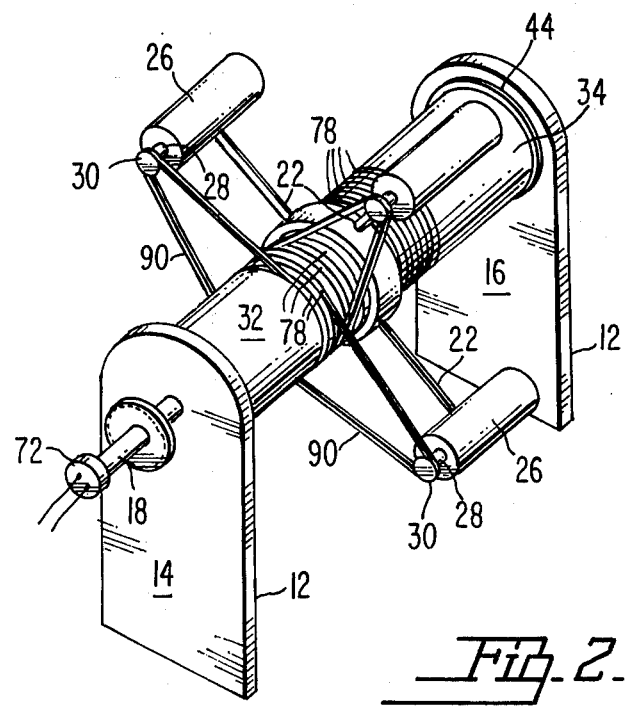
FIG. 2 is a perspective view of an embodiment of the energy conversion apparatus of the present invention.

The present invention comprises an energy conversion apparatus which is adapted to convert any type of mechanically rotating kinetic energy into electricity. The source of this kinetic energy would be as shown in FIG. 1 the drive means 10. To communicate this kinetic energy into a means usable by the energy conversion apparatus of the present invention an interconnecting gearing means including a drive sprocket 92 may be fixedly secured to the drive shaft means 18. This drive shaft means 18 is rotatably mounted within a support means 12 such as between a first strut means 14 and a second strut means 16. Each of these struts is positioned to be extending upwardly and at a spaced relation with respect to one another such that the drive shaft means can extend therebetween. Preferably the drive shaft means 18 defines a conduit 20 therein.

A plurality of arm means 22 extends radially outwardly from the drive shaft means 18. Also each of the arm means 22 preferably defines a duct 24 therein which is in communication with the conduit 20 defined within the drive shaft means 18.

A generator means 26 is located on the end of each of the plurality of arm means 22. Each generator means includes a rotor shaft means 28 and a pulley means 30 fixedly secured to the rotor shaft 28.

To cause rotation of the rotor shaft means 28 of each generator means 26 a first cylinder means 32 is positioned axially about the drive shaft means 18 between the location of arm means 22 and the first strut means 14. Similarly, a second cylinder means 34 is positioned about the drive shaft between the arm means 22 and the second strut means 16.

The first cylinder means 32 and the second cylinder means 34 are both adapted to be driven by said drive shaft such that they are rotated in a direction opposite therefrom. Each of the first and second cylinder means will define grooves 78 in the external surface thereof. These grooves will be adapted to receive belt means 90 therein. Preferably, each of the cylinder means together will define at least one groove 78 for each belt means 90. There will be one belt means 90 for each generator means 26. Each belt means will extend around the pulley means 30 of a given individual rotor shaft means 28 of an individual generator means 26. In this manner as the drive shaft rotates the first cylinder means 32 and the second cylinder means 34 will be caused to rotate in an opposite direction. This opposite direction of rotation will also be assumed by the belt means 90 and the pulley means 30 and as such the rotor shaft means 28 of each generator means 26 will be caused to rotate at a high speed in a direction opposite to the direction of rotation of the generators themselves. In this manner an increased efficiency of electrical generation by the generator means 26 will be achieved.

To facilitate rotation of the first and second cylinder means 32 and 34 an inner cylinder guide means 36 may be positioned fixedly secured to the arms 22. This inner cylinder guide means is basically the inner guide means for each individual cylinder and to facilitate in this purpose will include a bearing means such as a roller bearing means 38 therein. A first outer cylinder guide means 40 will be included fixedly secured to the first strut means at the outermost end of the first cylinder means 32 to provide a means for maintaining the first cylinder means in a horizontal orientation between the first outer cylinder guide means 40 and the inner cylinder guide means 36.

Similarly, a second outer cylinder guide means 44 will be extending around the outermost edge of the second cylinder means and be fixedly secured to the second strut means to thereby maintain the first cylinder means 32 in a horizontal orientation with the innermost end being supported by the inner cylinder guide means 36. To facilitate in this supporting the second outer cylinder guide means 44 will include a bearing means such as a roller bearing means 46 therein.

In order to achieve the reverse rotation of the first cylinder means 32 with respect to the direction of rotation of the drive shaft means 18 a first gear assembly 48 may be positioned adjacent the outer end of the first cylinder means. This first gear assembly will preferably include a first shaft gear means which is fixedly secured to the drive shaft means 18 to be rotatable therewith. The first gear assembly will also include a first reversing gear means which is rotatably secured to the first strut means 14 and is positioned in engagement with the first shaft gear means 54 to be rotated in an opposite direction therefrom. Furthermore, the first gear assembly 48 includes a first gear ring means 58 which is basically a ring gear fixedly secured to the first cylinder means 32 preferably about the outermost edge thereof. In this manner rotation of the first shaft gear means 54 will cause opposite rotation of the first reversing gear means 56 which will cause a similar rotation of the first gear ring means 58. The similar rotation between the first reversing gear means 56 and the first gear ring means 58 will cause the movement of the first cylinder means 32 in a direction opposite to the direction of rotation of the drive shaft means 18.

In a similar fashion, the second gear assembly 50 will include a second shaft gear means 60 which is fixedly secured to the drive shaft means 18 to be rotatable therewith. The second gear assembly 50 further includes a second reversing gear means 62 which is rotatably secured to the second strut means 16 and is positioned in engagement with the second shaft gear means 60. A second gear ring means 64 is included which is fixedly secured to the second cylinder means 34 and is basically a gear extending around the outermost edge thereof. This gear causes the second cylinder means 34 to be driven in a direction similar to the direction of rotation of the second reversing gear means 62 and thereby opposite to the direction of rotation of the second shaft gear means 60 and the drive shaft means 18.

In this manner, both the first cylinder means 32 and the second cylinder means 34 will be caused to rotate in a direction opposite to the direction of rotation of the wheel comprising the generators 26, the arms 22, and the drive shaft means 18. By the connection of the belt 90 between the cylinders and the pulley means 30 of the generators 26 a high speed rotation of the rotor shaft means 28 of each generator will be achieved and efficient electrical energy production will be created by the conversion of the kinetic energy supplied by the drive means 10 to the drive shaft means 18.

In order to provide an initial impetus of kinetic energy to this flywheel type configuration of the generators arms and drive shaft a pony motor means 66 may be included which can be selectively connected to the drive shaft by a clutching means 68 in order to impart an initial rotational momentum to the energy conversion apparatus of the present invention.

To facilitate the gathering of the electrical energy created by the individual generators 26 a plurality of electrical lines 70 may extend from the generators through the ducts 24 and through the conduit 20. These lines 70 can lead to a power transfer cap 72 located at the end of the drive shaft means 18 where the electrical energy is combined and provided in a usable form. Part of this energy can be utilized by passage through an electrical feedback line 74 to the drive means to provide an additional amount of energy to the drive shaft during low times of kinetic energy production by the drive means 10.

Alternatively, the present invention may include a flywheel means 76 associated with each rotor shaft means 28 to provide a rotational momentum thereto to assure a constant production of electrical energy.

While particular embodiments of this invention have been shown in the drawings and described above, it will be apparent that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. An energy conversion apparatus, being usable to convert any type of mechanically rotatable energy into electricity, which comprises:
   (a) a support means including a first strut means and a second strut means each extending upwardly;
   (b) a drive shaft means being rotatably mounted within said support means between said first strut means and said second strut means, said drive shaft means being hollow to define a conduit therethrough axially;
   (c) a plurality of arm means fixedly secured with respect to said drive shaft means and extending radially outward therefrom to be rotatable therewith;
   (d) a plurality of generator means secured to said arm means, each of said generator means including a rotatable rotor shaft means extending outwardly therefrom and a pulling means mounted on said rotor shaft means;
   (e) a first cylinder means rotatably positioned about said drive shaft means between said arm means and said first strut means;
   (f) a second cylinder means rotatably positioned about said drive shaft means between said arm means and said second strut means;
   (g) an inner cylinder guide means extending around the innermost edges of said first cylinder means and said second cylinder means and being secured to said arm means to maintain horizontal orientation of said first cylinder means and said second cylinder means during rotation thereof around said drive shaft means;
   (h) a first outer cylinder guide means extending around the outermost edge of said first cylinder means and being fixedly secured to said first strut means to maintain horizontal orientation of said first cylinder means in concert with said inner cylinder guide means during rotation of said first cylinder means;
   (i) a second outer cylinder guide means extending around the outermost edge of said second cylinder means and being fixedly secured to said second strut means to maintain horizontal orientation of said second cylinder means in concert with said inner cylinder guide means during rotation of said second cylinder means;
   (j) a first gear assembly operably secured to said drive shaft means to be driven thereby and operably secured to said first cylinder means to rotate same in a direction opposite to the direction of rotation of said drive shaft means;
   (k) a second gear assembly operably secured to said drive shaft means to be driven thereby and operably secured to said second cylinder means to rotate same in a direction opposite to the direction of rotation of said drive shaft means; and
   (l) a drive means in engagement with said drive shaft means to control rotational movement thereof.

2. The apparatus as defined in claim 1 wherein said first gear assembly includes:
   (a) a first shaft gear means fixedly secured to said drive shaft means to be rotatable therewith;
   (b) a first reversing gear means rotatably secured to said first strut means and positioned in engagement with said first shaft gear means; and
   (c) a first gear ring means fixedly secured with respect to said first cylinder means and engagement with said first reversing gear means to rotatably drive said first cylinder means in the opposite direction of rotation with respect to said drive shaft means.

3. The apparatus as defined in claim 1 wherein said second gear assembly includes:
   (a) a second shaft gear means fixedly secured to said drive shaft to be rotatable therewith;

(b) a second reversing gear means rotatably secured to said second strut means and positioned in engagement with said second shaft gear means; and (c) a second gear ring means fixedly secured with respect to said second cylinder means and in engagement with said second reversing gear means to rotatably drive said second cylinder means in the opposite direction of rotation with respect to said drive shaft means.

4. The apparatus as defined in claim 1 further comprising a pony motor means adapted to engage said drive shaft means to provide initial starting rotational momentum thereto.

5. The apparatus as defined in claim 4 further comprising a clutching means for selectively engaging said pony motor with respect to said drive shaft means.

6. The apparatus as defined in claim 1 wherein said arm means is hollow to define ducts therein which extend into said conduit within said drive shaft means, and where the apparatus further includes electrical lines leading from said generator means through said ducts and said conduits.

7. The apparatus as defined in claim 6 further comprising a power transfer cap positioned at the end of said drive shaft means adjacent said conduit, said power transfer cap adapted to gather the electricity passing through said electrical lead lines into a unitary usable form.

8. The apparatus as defined in claim 7 further including an electrical feedback line extending from said power transfer cap to said drive means to provide supplementary power to said drive means.

9. The apparatus as defined in claim 1 wherein each said generator means further includes a flywheel means fixedly secured with respect to each of said rotor shaft means to increase the rotational moment of inertia thereof.

10. The apparatus as defined in claim 1 wherein said first cylinder means and said second cylinder means define a plurality of groove means peripherally therearound to receive and retain said pulley means of said generator means therein.

11. The apparatus as defined in claim 1 wherein said inner cylinder guide means includes bearing means therein to facilitate the guiding and rotational movement of said first cylinder means and said second cylinder means.

12. The apparatus as defined in claim 1 wherein said first outer cylinder guide means includes bearing means therein to facilitate the guiding and rotational movement of said first cylinder means.

13. The apparatus as defined in claim 1 wherein said second outer cylinder guide means includes bearing means therein to facilitate the guiding and rotational movement of said second cylinder means.

14. An energy conversion apparatus, being usable to convert any type of mechanically rotatable energy into electricity, which comprises:

(a) a support means including a first strut means and a second strut means each extending upwardly;

(b) a drive shaft means being rotatably mounted within said support means between said first strut means and said second strut means, said drive shaft means being hollow to define a conduit therethrough axially;

(c) a plurality of arm means fixedly secured with respect to said drive shaft means and extending radially outward therefrom to be rotatable therewith, said arm means being hollow to define ducts therein which extend into said conduit within said drive shaft means;

(d) a plurality of generator means secured to said arm means, each of said generator means including a rotatable rotor shaft means extending outwardly therefrom and a pulling means mounted on said rotor shaft means, each of said generator means further including a flywheel means fixedly secured with respect to each of said rotor shaft means to increase the rotational moment of inertia thereof;

(e) a first cylinder means rotatably positioned about said drive shaft means between said arm means and said first strut means, said first cylinder means defining a plurality of grooves peripherally therearound to receive and retain each of said pulley means of said generator means therein;

(f) a second cylinder means rotatably positioned about said drive shaft means between said arm means and said second strut means, said second cylinder means further defining a plurality of groove means peripherally therearound to receive and retain each of said pulley means of said generator means therein;

(g) an inner cylinder guide means including a bearing means extending around the innermost edges of said first cylinder means and said second cylinder means and being secured to said arm means to maintain horizontal orientation of said first cylinder means and said second cylinder means during rotation thereof around said drive shaft means;

(h) a first outer cylinder guide means including a bearing means extending around the outermost edge of said first cylinder means and being fixedly secured to said first strut means to maintain horizontal orientation of said first cylinder means in concert with said inner cylinder guide means during rotation of said first cylinder means;

(i) a second outer cylinder guide means including a bearing means extending around the outermost edge of said second cylinder means and being fixedly secured to said second strut means to maintain horizontal orientation of said second cylinder means in concert with said inner cylinder guide means during rotation of said second cylinder means;

(j) a first gear assembly operably secured to said drive shaft means to be driven thereby and operably secured to said first cylinder means to rotate same in a direction opposite to the direction of rotation of said drive shaft means, said first gear assembly including;

1. a first shaft means fixedly secured to said drive shaft means to be rotatable therewith;
2. a first reversing gear means rotatably secured to said first strut means and positioned in engagement with said first shaft gear means;
3. a first gear ring means fixedly secured with respect to said first cylinder means and in engagement with said first reversing gear means to rotatably drive said first cylinder means in the opposite direction of rotation with respect to said drive shaft means;

(k) a second gear assembly operably secured to said drive shaft means to be driven thereby and operably secured to said second cylinder means to rotate same in a direction opposite to the direction of rotation of said drive shaft means, said second gear assembly including;
  1. a second shaft gear means fixedly secured to said drive shaft means to be rotatable therewith;
  2. a second reversing gear means rotatably secured to said second strut means and positioned in engagement with said second gear shaft means;
  3. a second gear ring means fixedly secured with respect to said second cylinder means and in engagement with said second reversing gear means to rotatably drive said second cylinder means in the opposite direction of rotation with respect to said drive shaft means;
(l) a drive means in engagement with said drive shaft means to control rotational movement thereof;
(m) a pony motor means adapted to engage said drive shaft means to provide initial starting rotational momentum thereto;
(n) a clutching means for selectively engaging said pony motor with respect to said drive shaft means;
(o) electrical line means leaving from said generator means through said ducts in said arms and through said conduits within said drive shaft; and
(p) a power transfer cap positioned at the end of said drive shaft means adjacent said conduit, said drive shaft means in electrical communication with said electrical line means to gather electricity passing therethrough into a unitary usable form, said power transfer cap adapted to disseminate the electrical energy gathered thereby as required.

* * * * *